Patented June 30, 1925.

1,544,529

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

PROCESS OF MAKING CHLORINATED RUBBER.

No Drawing. Application filed June 27, 1921, Serial No. 480,565. Renewed March 24, 1925.

*To all whom it may concern:*

Be it known that I, CARLETON ELLIS, a citizen of the United States, and a resident of Montclair, in the county of Essex and State of New Jersey, have invented certain new and useful Improvements in Processes of Making Chlorinated Rubber, of which the following is a specification.

This invention relates to a process of making chlorinated rubber.

Ordinary rubber in the unvulcanized condition will combine with chlorine to form a product which is much more soluble than the original rubber and which on exposure in a thin layer will dry to a hard surface instead of remaining permanently tacky or sticky in the manner of solutions of raw rubber.

When rubber is chlorinated in a solvent various difficulties arise, one of which is that the rubber is so slightly soluble that a good solution cannot be obtained through which chlorine gas will bubble uniformly.

In one form of the present invention it is an object to chlorinate rubber in the form of a pasty or plastic substance by mastication between rolls or otherwise while exposing to an atmosphere of chlorine or one containing chlorine as for example a mixture of chlorine and air or chlorine and an inert gas such as nitrogen. The term "diluent gas" is hereinafter used, as covering gases which do not combine chemically (under the conditions hereinafter set forth) with chlorine gas (at least to any considerable extent), and which, if present in small to moderate amounts, will not prevent the chlorination of the rubber.

While mastication may be carried out with the rubber alone without any softening agent, I prefer to add a softening substance such as benzol, toluol, solvent naphtha, carbon tetrachloride, trichlorethylene, etc. The amount of the softening agent may range from ten per cent upwards, the quantity used not being sufficient to form a solution of the rubber but to produce a pasty, jellified or plastic mass which may be kneaded or agitated in the presence of chlorine. In this way the use of an excessive amount of solvent is avoided. For example it is hardly possible to make a satisfactory solution in some cases by using more than one per cent of rubber in the solvent. This requires the evaporation of a large amount of solvent as well as the handling of a great bulk of material to secure only a small amount of finished product.

By the present process, at least in one form thereof, the kneading of a plastic mass of softened rubber in an atmosphere of chlorine enables the use of compact apparatus and substantially cheapens the cost of manufacture.

For example crêpe rubber is worked up with an equal weight of toluol or benzol to form a plastic material which can be readily worked between rolls in the cold. This material is placed in a masticating apparatus which is enclosed in a housing through which chlorine gas is admitted. The agitation is maintained until the rubber has taken up an adequate amount of chlorine, for example, until saturated with chlorine. The chlorinated product may then be washed, neutralized or otherwise treated to remove any excess of chlorine or any hydrochloric acid which may be present.

By working in the cold and avoiding elevation of temperature, for example by using water-cooled rolls, the chlorine does not attack the solvents mentioned with anything like the speed of chlorination of the rubber. Hence, solvents thus employed are not materially changed in boiling point by the treatment and may remain with the chlorinated rubber forming the basis of a solution of the substance which may be used for coating purposes or other objectives.

As the chlorinated rubber is more soluble than the original rubber the mass gradually reduces in consistency as the chlorination progresses.

In some cases it is advisable to chlorinate at higher temperatures especially when some substitution of chlorine in the rubber molecule is especially desired. Also, at a higher temperature chlorination of the solvent takes place more readily which is sometimes desired in the case where a heavier solvent is needed or where it is desired to have present chlorinated hydrocarbons such for example as di or trichlorbenzol. Thus in the treatment using benzol as a solvent, some mono chlorbenzol may form, together with smaller amounts of dichlorbenzol. Such a solvent composition may sometimes be used to advantage. When no chlorination of the solvent is desired or where a non-inflammable solvent agent is required, carbon tetrachloride may be used.

In another case strips of rubber may be suspended in a solvent such as carbon tetrachloride and chlorine bubbled into this solvent causing reaction with the rubber and production of a soluble chlorinated product which goes into solution, more or less, thus exposing fresh surfaces of rubber for the treatment. Agitation also may be employed in this case.

The product obtained may be dried to remove the solvent, the latter being recovered, forming a solid substance which may be produced in the form of films or powder or amorphous masses. This product may be incorporated with fillers such as wood flour, talc, barytes, zinc oxide, litharge, whiting, silex, asbestos, cotton, wool, sawdust and the like and molded and pressed into suitable articles of manufacture. Or the solution may be admixed with the filling material, thoroughly stirred and the solvent evaporated. The product may be ground if necessary and then pressed in a hot press to form a molded article. A suitable proportion is equal parts of filler and chlorinated rubber.

For example a ten to fifteen per cent solution of the chlorinated rubber is admixed with wood flour sufficient in amount to make equal parts of filler and binder, the solvent evaporated by warming and the product molded in a hot press. When fillers of higher specific gravity are used, the proportion should be varied correspondingly. Plastic compositions and molding compositions as herein described are claimed in copending cases 701,067, filed March 22, 1924 and 706,877 filed April 16, 1924.

By treatment of unvulcanized or raw rubber with chlorine or any equivalent halogenating agent a product of a desirable character as regards solubility, etc., is obtained and the invention in its preferred form is especially concerned with chlorinated unvulcanized rubber possessing a high degree of colloidal structure and possessing a high degree of strength, enabling films or fibres to be produced therefrom.

In one case a solution of chlorinated rubber in carbon bisulphide (originally a fifteen per cent solution but evaporated on the water bath until a thickish almost jelly-like consistency) was forced through a fine orifice under high pressure ($CO_2$ cylinder) and as the extruded material issued from the orifice it was carried forward at the same rate of speed producing a fine thread or fibre. The latter could be made indefinite in length without breakage. Under the microscope the fibre was found to be quite uniformly circular in cross section and possessing a fair degree of lustre. These threads could be braided or worked together into a web or fabric. The threads as thus prepared were only very slightly elastic under tension but when bent double between the fingers under considerable pressure they resume their original longitudinal position, without indications of "creasing". These fibres are not sticky and do not stick together when wound on a spool or bobbin. They may be colored by addition of dye to the carbon disulphide solution. For example a red fibre was obtained by means of an oil-soluble red dyestuff. Carbon disulphide is a good solvent for the chlorinated rubber and has the advantage, over heavier solvents, in making fibres, that after extrusion the fibre quickly sets and the residual solvent evaporates rapidly. However, two or more threads may be wound, twisted or braided together while some of the solvent is still present so as to cause adherence and to thus make a strong compact strand.

Single or composite threads may be used for making fabrics, etc., which are resistant to water and are relatively slow-burning or non-inflammable. Some may be prepared very lustrous, like silk, others are dull, giving a softer effect.

A small quantity of unchlorinated rubber, for example ten per cent of the latter may be added in some cases to modify the set, adhesion or other properties.

The making of fibres or threads and textile materials, as described herein, is claimed in copending case 701,029 filed March 22, 1924.

Another field of application is as a quick-drying cement. Being much more soluble than rubber in most cases, concentrated solutions may be prepared, e. g. a paste or jelly of chlorinated rubber in carbon bisulphide, which may be used for cementing wood, leather and other materials. The laps or joints of leather belting may thus be cemented with a waterproof cement. When carbon disulphide is objectionable other solvents such as benzol may be used.

Cements as described herein are claimed in a copending case 701,020, filed March 22, 1924.

A thirty to fifty per cent solution of the chlorinated rubber in carbon disulphide has many uses.

A fifteen to twenty per cent solution in the same solvent or in a mixture of carbon disulphide and benzol may be used for producing films. These may be made in several ways. One method is to pour the solution on to a glass plate, allow to dry then strip the film. With properly made chlorinated rubber a clear light colored tough film is obtained. This is very difficult to ignite in comparsion with most other film materials.

Of course a dark dirty rubber (after chlorination) will not give the same grade of film or thread as a clean light-colored raw rubber.

Another feature of the invention is that of coating or impregnating textile materials. For example ordinary cotton thread is passed through an impregnating solution of chlorinated rubber in carbon disulphide (ten to twenty-five per cent solution is useful) the thread dried, when a waterproofed or more water-resistant product is obtained. Similarly cloth may be impregnated. Several layers of freshly impregnated cloth may be pressed together to form artificial leather etc.

This subject matter is claimed in copending cases 706,879 and 706,880, April 16, 1924.

Leather, or cloth may be coated with chlorinated rubber to yield a surface which may be embossed as desired.

Paper likewise may be coated or impregnated.

The addition of other solids to the chlorinated rubber is possible. In addition to raw or unvulcanized rubber mentioned above, vulcanized rubber or reclaimed rubber may be introduced into the solution of chlorinated rubber. Also other substances of a kindred or related nature such as gutta percha, balata, chicle, synthetic rubber, etc. may be added in some cases. Various resins such as copal (Kauri, Manila, Congo, Pontianak, etc.) either in natural state or melted and "run" as in making varnishes may be added.

It is also possible to chlorinate a rubber having a resin naturally associated with it so that both rubber and resin are chlorinated (co-chlorinated).

Chlorinated rubber may be admixed with phenol, cresol and the like and treated with formaldehyde, paraform, hexamethylene tetramine, etc., and then heated to furnish a hardened product.

Softening agents such as camphor, triphenyl or tri cresyl phosphate, castor oil, highly chlorinated hydro-carbons, etc. may be added. This matter is in part continued from an older application No. 442,245, and is claimed in copending case 597,416. Also an ant-acid material such as urea, diphenyl amine, phenylene diamine, aniline, toluidine, etc. may be introduced, this subject matter being continued from my copending case 442,245, filed February 3, 1921, and is claimed in my copending case 701,021 filed March 22, 1924.

Drying oils such as linseed or tung oil do not blend to best advantage with chlorinated rubber but may be used for certain purposes.

These various additions which optionally may be introduced may be used in minor or major proportion with respect to the content of chlorinated rubber.

In the process of making chlorinated rubber as above set forth preferably a concentrated solution or magma of rubber, or the rubber alone, is exposed to chlorine. However for some purposes a product may be made by chlorinating in true solution, using for example one or two per cent solutions or stronger solutions for the purpose. Chlorination or halogenation, involving introducing ten to thirty per cent of chlorine or other halogen or even more than this is within the purview of the present invention.

Where the term "rubber" is used in the specification, it is to be understood that rubber or its equivalent for the purposes herein intended is embraced by said term.

To secure a thread of exceedingly high lustre the following procedure may be employed.

100 grams crêpe rubber light yellow in color are dissolved in 3500 cc. trichlor ethylene. The solution is placed in a cooled receptacle and chlorinated with a slow stream of chlorine for about 15 hours. (At the end of 5 hours a sample withdrawn from the cooling bath, exposed to sunlight, commenced to boil very vigorously). The weight is taken from time to time and the chlorination continued 3 hours after no further gain in weight is observable. During the last 4 hours the bath is withdrawn and the solution allowed to reach room temperature or higher (e. g. 40—50° C.). The chlorinated rubber is precipitated by alcohol, redissolved in benzol and dried. The dry product is taken up in carbon disulphide to form a good solution of about fifteen per cent strength and evaporated to a thick syrup of suitable thread-forming consistency. This solution is extruded through a fine orifice of glass and the soft thread carried forward and away from the orifice at the rate of extrusion.

By proceeding substantially in the above manner a fibre of remarkable lustre has been obtained. When this is wound on a bobbin it resembles fine platinum or silver wire. Although transparent, so great is its lustre that the appearance is notably silvery. With such a fibre it would be possible to produce silver-like fabrics.

The foregoing procedure is somewhat complicated and various simplifications and "short-cuts" are possible with a greater or less change in the characteristics of the resulting fibre.

A fibre made by impregnating cotton or other fibrous thread with a chlorinated rubber solution was given a surface coating of chlorinated rubber as follows. The thread was passed through a receptacle containing chlorinated rubber solution and was drawn through an orifice in this receptacle. The orifice was slightly larger than the thread so that a coating of chlorinated rubber covered the fibre thus obtained. The latter possessed a medium lustre.

What I claim is:—

1. The process of treating rubber which comprises masticating it with a volatile solvent softening agent in such proportions as to form a plastic mass and agitating this mass in an atmosphere of chlorine.

2. The process of treating rubber which comprises masticating it with a hydrocarbon solvent softening agent only in such proportions as to form a plastic mass and agitating this mass in an atmosphere of chlorine.

3. The process of treating unvulcanized rubber which comprises masticating it with a volatile solvent softening agent only in such proportions as to form a plastic mass and exposing the softened rubber to an atmosphere of chlorine gas.

4. The process of treating unvulcanized rubber which comprises masticating it with a softening agent only in such proportions as to form a plastic mass and exposing this mass to an atmosphere containing chlorine.

5. The process of chlorinating rubber which comprises masticating rubber in an atmosphere of chlorine and a diluent gas.

6. The process of chlorinating rubber which comprises masticating rubber in an atmosphere of chlorine and air.

7. The process of chlorinating rubber which comprises masticating rubber in an atmosphere of diluted chlorine in the cold.

8. The process of chlorinating rubber which comprises masticating softened rubber in an atmosphere of chlorine and a diluent gas.

9. The process of chlorinating rubber which comprises masticating unvulcanized softened rubber in the cold in an atmosphere containing chlorine.

10. The process of chlorinating rubber which comprises masticating unvulcanized softened rubber in an atmosphere containing chlorine.

11. The process of chlorinating unvulcanized rubber which comprises exposing unvulcanized softened rubber in the cold to an atmosphere containing chlorine.

12. The process of chlorinating rubber which comprises masticating a plastic mass of softened rubber in the cold while bathed in an atmosphere containing chlorine.

13. The process of chlorinating rubber which comprises exposing unvulcanized rubber to the action of chlorine in the presence of a volatile solvent of the rubber used, such solvent being present in an amount insufficient to put the rubber into solution.

14. The process of chlorinating rubber which comprises exposing unvulcanized rubber to the action of chlorine in the presence of an aromatic hydrocarbon solvent of the rubber used, such solvent being present in an amount representing a small fraction of the amount necessary to put the rubber into solution.

15. The process of chlorinating rubber which comprises exposing raw rubber to the action of chlorine in the presence of benzol present in an amount insufficient to put the rubber into solution.

16. The process which comprises exposing unvulcanized rubber carried in a vehicle which is a solvent for such rubber, but which vehicle is present in amount equal to only a minor fraction of that amount which would be necessary to dissolve the rubber, such vehicle and rubber being in the form of a plastic mass, to the action of chlorine, at a temperature high enough to cause both rubber and vehicle to be chlorinated.

17. The process of making a solution of chlorinated rubber, which comprises incorporating raw rubber in a solvent comprising a liquid aromatic hydrocarbon, in such proportions as to form a plastic mass, exposing to chlorine gas, and removing excess chlorine and acid from the solution thus obtained.

18. The process of making a chlorinated rubber solution which comprises acting on raw rubber carried in a chlorinable hydrocarbon solvent medium in such proportions as to form a plastic mass, at a temperature at which both the rubber and solvent are chlorinated.

CARLETON ELLIS.